US011413685B2

(12) United States Patent
Sasaki et al.

(10) Patent No.: US 11,413,685 B2
(45) Date of Patent: Aug. 16, 2022

(54) SILVER POWDER MIXTURE, METHOD FOR PRODUCING SAME, AND CONDUCTIVE PASTE

(71) Applicant: DOWA ELECTRONICS MATERIALS CO., LTD., Tokyo (JP)

(72) Inventors: Genta Sasaki, Tokyo (JP); Taku Okano, Tokyo (JP); Yoshio Moteki, Tokyo (JP); Yu Saito, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 56 days.

(21) Appl. No.: 16/644,582

(22) PCT Filed: Sep. 19, 2018

(86) PCT No.: PCT/JP2018/034543
§ 371 (c)(1),
(2) Date: Mar. 5, 2020

(87) PCT Pub. No.: WO2019/065379
PCT Pub. Date: Apr. 4, 2019

(65) Prior Publication Data
US 2021/0060655 A1 Mar. 4, 2021

(30) Foreign Application Priority Data

Sep. 27, 2017 (JP) .............................. JP2017-187249

(51) Int. Cl.
*C07K 14/255* (2006.01)
*A61K 38/00* (2006.01)
(Continued)

(52) U.S. Cl.
CPC ................. *B22F 9/24* (2013.01); *B22F 1/05* (2022.01); *B22F 1/0547* (2022.01); *B22F 1/065* (2022.01);
(Continued)

(58) Field of Classification Search
CPC ................. B22F 1/0025; B22F 1/0055; B22F 2001/0037; B22F 2301/255
See application file for complete search history.

(56) References Cited

U.S. PATENT DOCUMENTS

| 2013/0221287 A1* | 8/2013 | Takahash | ................. H01B 1/02 252/512 |
| 2014/0220341 A1* | 8/2014 | Choi | ..................... B82Y 30/00 428/372 |
| 2016/0114390 A1* | 4/2016 | Hori | ..................... B22F 1/0014 252/512 |

FOREIGN PATENT DOCUMENTS

| JP | 2010-153364 | 7/2010 |
| JP | 2013-513220 | 4/2013 |

(Continued)

OTHER PUBLICATIONS

Machine translation JP2015065098A (Year: 2015).*

*Primary Examiner* — Alexandre F Ferre
(74) *Attorney, Agent, or Firm* — Clark & Brody LP (57) ABSTRACT

A silver powder mixture that is suitable for forming a conductive film on a surface of a member having stretchability, a method for producing the same, and a conductive paste using the silver powder mixture is provided. A silver powder mixture containing filamentous silver powder including spherical and filamentous parts and flaky silver powder having an average particle diameter of 1 μm or more and 50 μm or less and an aspect ratio, which is defined by a ratio of an average long diameter and an average thickness, of 1.5 or more is obtained by adding one kind or two or more kinds of a salt of copper and aluminum and ethylenediaminetetraacetic acid to a silver nitrate aqueous solution, for 60 seconds or more, and then adding a reducing agent containing one kind or two or more kinds of L-ascorbic acid, erythorbic acid, and salts thereof.

7 Claims, 2 Drawing Sheets

(51) Int. Cl.
    *A61K 39/00*     (2006.01)
    *A61P 37/06*     (2006.01)
    *B22F 9/24*     (2006.01)
    *C09D 7/40*     (2018.01)
    *C09D 5/24*     (2006.01)
    *H01B 1/16*     (2006.01)
    *B22F 1/05*     (2022.01)
    *B22F 1/065*     (2022.01)
    *B22F 1/068*     (2022.01)
    *B22F 1/054*     (2022.01)

(52) U.S. Cl.
    CPC ................ *B22F 1/068* (2022.01); *C09D 5/24* (2013.01); *C09D 7/70* (2018.01); *H01B 1/16* (2013.01); *B22F 2301/255* (2013.01); *B22F 2304/10* (2013.01)

(56) References Cited

FOREIGN PATENT DOCUMENTS

| | | | |
|---|---|---|---|
| JP | 2013-105525 | | 5/2013 |
| JP | 2014-203815 | | 10/2014 |
| JP | 2015-065098 | | 4/2015 |
| JP | 2015-073105 | | 4/2015 |
| JP | 2015-083045 | | 4/2015 |
| JP | 2015065098 A | * | 4/2015 |
| JP | 2016-014111 | | 1/2016 |
| WO | 2011/071885 | | 6/2011 |
| WO | 2015/083421 | | 6/2015 |

* cited by examiner

SILVER POWDER MIXTURE, METHOD FOR PRODUCING SAME, AND CONDUCTIVE PASTE

TECHNICAL FIELD

The present invention relates to mixed silver powder that is suitable for forming a conductive film on a surface of a member having stretchability, a method for producing the same, and a conductive paste using the mixed silver powder.

BACKGROUND ART

In recent years, an electronic equipment that is referred to as a wearable device capable of being mounted on the human body has been actively developed as shown, for example, in PTL 1. The wearable device is frequently provided on cloth having a stretchability, such as the device described in PTL 2, and therefore the electrode constituting the circuit of the wearable device is demanded to have a capability of forming at a low temperature and a stretchability.

Examples of a material that is capable of forming an electrode with a conductive film on a member having a flexibility at a low temperature include the silver pastes described in PTL 3 and PTL 4. The silver pastes contain, as a major component, a low temperature curing resin as a binder having mixed therewith silver powder formed of metallic silver fine particles as a conductive filler, and the silver powder used is mainly a flaky material. The silver pastes can form a circuit of a conductive film on a surface of a stretchable member, such as cloth, in such a manner that a circuit pattern is formed by such a measure as screen printing or the like, and then the resin as the binder is cured at a low temperature, but have a problem that the volume resistivity of the conductive film is significantly increased when the member is stretched and contracted.

As a technique for improving the characteristics of the silver paste for forming a conductive film, for example, PTL 5 and PTL 6 describe mixed silver powder having plural kinds of silver powder having different shapes, but these related techniques do not describe mixed silver powder that is suitable for forming a conductive film on a stretchable member. For example, PTL 5 describes a silver powder mixture obtained by mixing filamentous silver powder with one kind or two kinds of granular silver powder and flaky silver powder, but the silver powder mixture intends to improve the thixotropy of the silver paste, and the stretchability of the baked film of the silver paste is insufficient for applying to a stretchable member.

CITATION LIST

Patent Literatures

PTL 1: JP-A-2015-083045
PTL 2: JP-A-2014-203815
PTL 3: JP-A-2016-014111
PTL 4: JP-A-2015-073105
PTL 5: JP-A-2015-065098
PTL 6: JP-A-2013-105525

SUMMARY OF INVENTION

Technical Problem

In the techniques described in PTL 1 and PTL 2, the flaky silver powder is used as a conductive filler for providing a good conductivity through the overlap of the flaky silver powder in the conductive layer. In the techniques, however, the silver paste is cured at a low temperature, and the flaky silver powder is only in contact with each other simply physically in the cured resin. Therefore, in the case where the conductive film formed by curing the silver paste is stretched and contracted, it is considered that the contact among the silver powder is lost to result in the increase of the volume resistivity of the conductive film.

As a result of the earnest investigations by the present inventors, it has been found that in the case where a circuit of a conductive film is formed on a stretchable member with a conductive paste using, as a conductive filler, a silver powder mixture obtained by mixing filamentous silver powder having a particular shape and good low temperature sintering capability with silver powder having another shape, the extent of the decrease of the volume resistivity of the conductive film after stretching and contracting the member is decreased, and thus the present invention has been completed.

The silver powder mixture of plural kinds of silver powder different in shape as described above can be produced by mixing flaky silver powder and filamentous silver powder having the prescribed shapes, and can be efficiently produced at low cost by a wet reduction method of silver ion.

Accordingly, an object of the present invention is to provide a silver powder mixture that is suitable for forming a conductive film on a surface of a member having a stretchability, a method for producing the same, and a conductive paste using the silver powder mixture.

Solution to Problem

The object of the present invention can be achieved by one embodiment of the present invention, i.e., a silver powder mixture containing filamentous silver powder including a spherical part and a filamentous part, the filamentous part extending from the spherical part and having a short axis length that is smaller than a particle diameter of the spherical part.

It is possible that the silver powder mixture contains the filamentous silver powder and flaky silver powder, and has a projected area ratio of the filamentous silver powder of 20% or more. In this case, it is preferred that the filamentous part of the filamentous silver powder has an average long axis length of 2 μm or more and 20 μm or less and an average short axis length of 50 nm or more and 900 nm or less, and the flaky silver powder has an average particle diameter of 1 μm or more and 50 μm or less and an aspect ratio, which is defined by a ratio of an average long diameter and an average thickness, of 1.5 or more, the silver powder mixture is preferred, and it is more preferred that the silver powder mixture has a projected area ratio of the filamentous silver powder of 20% or more in the mixed silver powder.

It is more preferred that the silver powder mixture has a content of granular silver powder of less than 20%.

The present invention provides filamentous silver powder having a shape including a spherical part and a filamentous part extending from the spherical part and having a short axis length that is smaller than a particle diameter thereof, and also provides a silver powder mixture containing filamentous silver powder having that shape and flaky silver powder.

As a method for producing the silver powder mixture, there is provided a production method including: adding one kind of a salt of copper or aluminum and ethylenediaminetetraacetic acid to a silver nitrate aqueous solution to provide a silver complex solution; after adding ethylenediaminetetraacetic acid, retaining the silver complex solution under stirring for 90 seconds or more (preferably 110 seconds or more); and adding a reducing agent containing one kind or two or more kinds of L-ascorbic acid, erythorbic acid, and salts thereof to the retained silver complex solution.

In the production method, it is possible that the silver complex solution before adding the reducing agent has a silver concentration of from 0.05 mol/L to 1 mol/L, and an amount of the reducing agent added is from 0.05 mol/L to 1 mol/L based on the liquid amount of the silver complex solution before adding the reducing agent. It is also possible that in the silver complex solution, an amount of the one kind or two or more kinds of a salt of copper and aluminum added is from 0.001 to 0.02 in terms of molar ratio with respect to silver, and an amount of the ethylenediaminetetraacetic acid added is from 0.0005 to 0.015 in terms of molar ratio with respect to silver.

The present invention provides a conductive paste including the silver powder mixture.

Advantageous Effects of Invention

According to the present invention, filamentous silver powder and a silver powder mixture that are suitable for forming a conductive film on a surface of a member having a stretchability can be produced by an inexpensive wet reduction method.

DESCRIPTION OF EMBODIMENTS

[Filamentous Silver Powder]

The silver powder mixture of the present invention contains filamentous silver powder including a spherical part and a filamentous part extending from the spherical part. The spherical part may be expressed as a head part, and the filamentous part may be expressed as a tail part or a ciliary part.

The filamentous part preferably has an average long axis length of 2 μm or more and 20 μm or less and an average short axis length of 50 nm or more and 900 nm or less, measured with a scanning electron microscope (SEM). In the case where the average long axis length of the filamentous part is less than 2 μm, the effect of the filamentous shape may not be obtained, and a conductive paste containing the silver powder mixture may have a decreased viscosity and an increased resistance in some cases. In the case where the average long axis length exceeds 20 μm, it may be difficult to handle in the similar manner as the ordinary silver powder. In the case where the average short axis length of the filamentous part is less than 50 nm, it may be difficult to handle in the similar manner as the ordinary silver powder. In the case where the average short axis length exceeds 900 nm, the conductivity of the conductive film tends to decrease due to the decreased axial ratio.

The spherical part preferably has a particle diameter that is larger than the short axis length of the filamentous part, and preferably has an average of a particle diameter as a circle-equivalent diameter measured with SEM of from 0.15 to 2 μm. The particle diameter (circle-equivalent diameter) of the spherical part is preferably larger than the average of the short axis length of the filamentous part by twice or more, and more preferably thrice or more. The spherical or granular shape herein means that the aspect ratio is less than 1.5, and the part that is connected to the filamentous part is referred to as a spherical part, whereas the part that is independent is referred to as granular silver powder.

The filamentous part of the filamentous silver powder contained in the silver powder mixture obtained by the production method of the present invention is poor in straightness but has a curved shape, and may have at least one, generally from 1 to 10, curved portions (curvatures) in the longitudinal direction, and the curvature radius at the center line of the filamentous part is preferably twice or more the short axis length.

The mechanism that the silver powder mixture obtained by the production method of the present invention is excellent in stretching resistance as compared to the silver powder mixture described in PTL 5 is not currently clear, and can be estimated by the present inventors as follows.

Specifically, while the filamentous silver powder has an average short axis length of the filamentous part of 50 nm or more and 900 nm or less, which is the so-called nanosize, and is excellent in low temperature sintering capability by itself, the filamentous silver powder contained in the silver powder mixture obtained by the production method of the present invention has a spherical part at the end thereof, and it is considered that the spherical part has lower surface energy than the filamentous part and is further excellent in low temperature sintering capability. Accordingly, it is considered that the spherical part of the filamentous silver powder is firmly bonded to the silver powder having another shape described later, as compared to filamentous silver powder having no spherical part.

In the case of the silver powder mixture of the present invention, it is considered that the filamentous silver powder is firmly sintered on the surface of the flaky silver powder in curing the conductive paste at a relatively low temperature, and a crosslinked structure is formed among the flaky silver powder with the filamentous silver powder. The filamentous silver powder generally has a curved structure, and it is considered that when the conductive film formed through low temperature sintering is stretched and contracted, the filamentous silver powder is also stretched and contracted following thereto, and thereby the crosslinked structure is prevented from being broken to enhance the stretching resistance of the conductive film, as compared to the mixed silver powder described in PTL 5.

It is considered that the filamentous silver powder contained in the silver powder mixture obtained by the production method of the present invention has the aforementioned form, as a result of the mechanism that in the production method of the present invention, the spherical particle is formed with a copper or aluminum nucleus as the center, and simultaneously the growth of the particle rapidly proceeds in a particular direction to form the filamentous part like a thread extending from the spherical particle.

[Flaky Silver Powder]

The production of a silver powder mixture by the wet production method forms silver powder having various shapes including flaky silver powder, granular silver powder, and the like, in addition to the filamentous silver powder, and for forming a conductive film on a surface of a member having stretchability, the silver powder mixture preferably contains flaky silver powder in addition to the filamentous silver powder.

The flaky shape herein means an article in the form of flakes or scales. The flaky silver powder contained in the silver powder mixture of the present invention preferably has an aspect ratio, which is defined by the ratio of the average long diameter and the average thickness, measured with a scanning electron microscope (SEM) of 1.5 or more.

The aspect ratio that is less than 1.5 is not preferred since the contact among the flaky silver powder tends to be insufficient in the circuit of the conductive film formed by mixing the flaky silver powder in the conductive paste, failing to achieve the sufficient conductivity. While the upper limit of the aspect ratio is not determined in the present invention, a material having an aspect ratio exceeding 500 is difficult to produce. The aspect ratio is more preferably from 10 to 100, and further preferably from 20 to 50.

The average particle diameter of the flaky silver powder is preferably 1 μm or more and 50 μm or less in terms of the cumulative 50% volume particle diameter (D50) by the laser diffraction scattering particle size distribution measurement method. In the case where the average particle diameter is less than 1 μm, the conductivity of the conductive film tends to be low due to the insufficient contact area among the flaky silver powder. In the case where the average particle diameter exceeds 50 μm, the crosslinked structure formed tends to be short due to the too large size of the individual particles of the flaky silver powder. The average particle diameter of the flaky silver powder is more preferably from 3 to 30 μm, and further preferably from 6 to 15 μm.

[Mixing Ratio of Silver Powder]

The silver powder mixture of the present invention preferably contains the filamentous silver powder in a projected area ratio of the filamentous silver powder contained in the silver powder mixture, which is defined below, of 20% or more, and more preferably 30% or more. In the case where the projected area ratio is less than 20%, the sufficient crosslinked structure cannot be constituted in stretching and contracting the conductive film in some cases.

In a mixture of silver powder having various shapes including filamentous silver powder, flaky silver powder, granular silver powder, and the like, for measuring the weight ratios of the shapes strictly, it is necessary to separate and select the shapes by separating depending on specific gravity or on shape by sieving, which cannot be achieved readily. It is the current situation that flaky silver powder and granular silver powder are available as silver powder that contains only that shape, but silver powder formed of 100% of filamentous silver powder without separation and selection is not currently available, and the projected area ratio is, for example, 90% or less.

In the production method of the present invention, it is difficult to produce solely filamentous silver powder having the prescribed shape without separation and selection, and a mixture that also contains flaky silver powder and granular silver powder may be produced. The characteristics of the silver powder mixture can also be controlled by adding flaky silver powder or the like produced by another production method to the resulting silver powder mixture.

The investigations by the present inventors have revealed that the granular silver powder (i.e., the independent silver powder having an aspect ratio of less than 1.5) does not contribute to the enhancement of the stretching resistance of the conductive film, and therefore in the silver powder mixture of the present invention, the granular silver powder is preferably controlled to have a projected area ratio of less than 20% based on the total silver powder mixture.

The area ratios of the silver powder having the various shapes defined in the present invention can be calculated from the projected areas in a micrograph of scanning electron microscope (SEM image) of the silver powder mixture, for example, by the following procedure. The magnification of the SEM image may be such a value that enables the comprehension of the average state of the silver powder mixture, and for example, an SEM image having a magnification of 2,000 may be used.

In the silver powder mixture obtained by the present invention, the filamentous part of the filamentous silver powder is seen brighter since the average short axis length thereof is small to provide a high secondary electron emission efficiency. Accordingly, the projected area ratio, which is calculated in such a manner that the filamentous part and the spherical part connected to the filamentous part of the filamentous silver powder in the silver powder mixture in the SEM image are designated as the region with higher brightness by using an image analysis software, can be designated as the ratio of the filamentous silver powder in the silver powder mixture.

The image analysis software used may be, for example, "Region Adviser", produced by System In Frontier, Inc.

For the independent granular silver powder, circular markers are manually disposed on the image with the initial contrast and luminance, and the total value of the areas in selecting all the markers is designated as the "granular area". The marker regions are then controlled to have a darker contrast, and the filamentous silver powder and the flaky silver powder except for the marker regions can be calculated in the following manner.

As the calculation method of the projected areas of the filamentous silver powder and the flaky silver powder, the SEM image is downloaded to the image analysis software, and after removing noise by the "smoothing" process, the region with no silver powder present having darkness with a brightness less than the threshold value is identified to calculate the "total area of the silver powder". Thereafter, the contrast and the luminance are intensified to confirm that the filamentous silver powder is identical to the region having a brightness of the threshold value or more, and the SEM image is binarized to calculate the total area with a brightness of the threshold value or more as the "filamentous area". In the case where no granular silver powder is observed, and only the filamentous silver powder and the flaky silver powder are contained, the flaky shape is calculated by (total area of silver powder)−(filamentous area)=(flaky area). In the case where the granular silver powder is observed, the flaky shape is calculated by using the "granular area", i.e., (total area of silver powder)−(filamentous area)−(granular area)=(flaky area).

The operation is performed for three or more view fields of the SEM images, and in each of the view fields, the area ratio of the filamentous silver powder is calculated by (filamentous area)/(total area of silver powder), the projected area ratio of the flaky silver powder is calculated by (flaky area)/(total area of silver powder), and the area ratio of the granular silver powder is calculated by (granular area)/(total area of silver powder), from which the average values of the projected area ratios thereof can be calculated.

[Raw Material Solution]

As described above, the silver powder mixture of the present invention can be produced by one process using a wet reduction method of silver ion.

In the production method of the silver powder mixture of the present invention, an acidic aqueous solution containing silver(1) ion and nitrate ion is used. The acidic aqueous solution may be prepared, for example, by dissolving silver nitrate in water, and can also prepared by dissolving a silver compound, such as silver(1) oxide and silver(1) carbonate, in an aqueous solution containing nitric acid.

In the production method of the present invention, a silver complex solution that contains the acidic solution containing silver(1) ion and further contains one kind of a salt of copper(2) or aluminum is used as a raw material solution. Copper(2) ion or aluminum ion has a function of accelerating the anisotropic growth of silver particles deposited through reduction in the aqueous solution, and therefore the silver powder obtained by the production method of the present invention becomes a silver powder mixture containing filamentous silver powder.

The concentration of silver in the raw material solution in the stage before the addition of the reducing agent described later is preferably from 0.05 mol/L to 1.0 mol/L, and more preferably from 0.2 to 0.6 mol/L. There are tendencies that the proportion of the flaky shape is increased with an increased silver concentration, whereas the proportion of the filamentous shape is increased with a decreased silver concentration.

The ion concentration of the one kind of copper(2) ion and aluminum ion in the raw material solution is preferably 0.0010 or more and 0.0200 or less in terms of molar ratio with respect to the amount of silver(1) ion.

In the case where the molar ratio of the one kind of copper(2) ion and aluminum ion with respect to the amount of silver(1) ion is less than 0.0010, the anisotropy in crystal growth tends to be short to lower the proportion of the filamentous silver powder occupied in the silver powder mixture. In the case where the molar ratio of the one kind of copper(2) ion and aluminum ion exceeds 0.0200, the amount of the granular silver powder formed tends to increase. The source of copper(2) ion used may be a copper compound having a high solubility to water, such as copper(2) nitrate trihydrate and basic copper(2) carbonate. The source of aluminum ion used may be an aluminum compound having a high solubility to water, such as aluminum nitrate nonahydrate.

[Ethylenediaminetetraacetic Acid]

In the production method of the present invention, before adding the reducing agent described later to the raw material solution containing silver(1) ion and the one kind of copper (2) ion and aluminum ion, ethylenediaminetetraacetic acid (which may be hereinafter referred to as EDTA) as a complexing agent for the metal ions is added. The purpose of the addition of EDTA to the raw material solution is to form a complex of EDTA and copper(2) ion, so as to control the form of mixed silver powder formed through the reduction reaction. EDTA includes a 4Na salt and a 2Na salt, and a 4Na salt, which has a high solubility to water and is readily available, is preferably used. EDTA may be added in the form of solid or may be added after forming an aqueous solution thereof by dissolving in water.

The amount of EDTA added to the raw material solution is preferably 0.0005 or more and 0.0150 or less in terms of molar ratio (EDTA/Ag) with respect to the amount of silver(1) ion contained in the raw material solution. In the case where the molar ratio of EDTA with respect to the amount of silver(1) ion is less than 0.0005, the anisotropy in crystal growth in the reduction deposition may be insufficient due to the decreased amount of the EDTA-copper(2) complex formed, and thereby the proportion of the filamentous silver powder occupied in the total mass of the silver powder mixture may be decreased. In the case where the molar ratio of EDTA exceeds 0.0150, the amount of the EDTA-silver(1) complex formed may be increased, and the amount of the granular silver powder formed may be increased.

The mechanism that the proportion of the filamentous silver powder occupied in the resulting silver powder is increased by performing the reduction reaction after forming the silver complex solution containing EDTA-silver(1) and EDTA-copper(2) by adding EDTA to the raw material solution is not currently clear, and can be estimated by the present inventors as follows.

Specifically, it is considered that in the reduction of the EDTA-copper(2) complex, the reduction of copper(2) ion tends to occur from the direction where a nitrogen atom is coordinated, which makes an anisotropy in crystal growth of copper functioning as the initial nucleus of deposition of silver, and silver is deposited by inheriting the anisotropy, resulting in the growth of the filamentous silver powder.

In the production method of a silver powder mixture of the present invention, a retention time of 90 seconds or more is provided after the addition of EDTA to the raw material solution. This is because the formation of the complex is completed within the retention time, and the projected area ratio of the flaky silver powder and the filamentous silver powder determined in the present invention is achieved.

In the case where the reducing agent described later is added immediately after the addition of the EDTA to the raw material solution, copper(2) ion that has not yet been complexed is directly reduced to increase the amount of fine granular silver powder formed, which is not preferred since the ratio of the present invention may not be achieved. The upper limit of the retention time is not particularly determined in the present invention, and is preferably 600 seconds or less in consideration of the economical efficiency.

The reaction temperature of the step of adding EDTA to the raw material solution is not particularly determined in the present invention, and is preferably from 20 to 30° C. In the case where the reaction temperature exceeds 30° C., the temperature in the subsequent reduction reaction may be excessively increased to cause danger in some cases.

[Reducing Agent]

In the production method of the present invention, silver (1) ion contained in the aqueous solution is reduced with a reducing agent to provide the silver powder mixture. The reducing agent is preferably an organic reducing agent that unlikely leave impurities in the silver powder mixture as the final product, and in particular, L-ascorbic acid, erythorbic acid, or a salt thereof, which causes the reaction gradually, is preferably used.

The amount of the reducing agent added is preferably from 0.50 to 2.00, and more preferably from 0.50 to 1.00, in terms of molar ratio with respect to silver. With an amount of less than 0.50, silver in the solution cannot be completely reduced in some cases. With an amount exceeding 2.00, the reducing reaction may be stabilized due to the excessive amount of the reducing agent, and thereby the proportion of the granular silver powder formed may be increased.

The concentration of the reducing agent solution is preferably in a range of from 0.05 mol/L to 1.0 mol/L, and more preferably from 0.2 to 0.6 mol/L. With the use of the reducing agent having a too large concentration exceeding 1.0 mol/L, the filamentous silver powder may be difficult to form.

In the addition of the reducing agent, for making the state where the reducing agent is diffused uniformly within a short period of time, the time of adding the reducing agent to silver is preferably from 1 second to 70 seconds. With an increased addition rate, the reducing agent is rapidly diffused to facilitate the anisotropy in crystal growth, resulting in a tendency that the spherical shape is decreased, and the flaky shape and the filamentous shape are increased. Furthermore, the fluctuation in size of the particles in each of the shapes may be decreased.

The reaction temperature of the process of the reducing reaction is not particularly determined in the present invention, and is preferably from 20 to 70° C. In the case where the reaction temperature is less than 20° C., the crystal growth may not be facilitated, and the filamentous silver powder may be difficult to form. In the case where the reaction temperature exceeds 70° C., there may be danger in production.

[Surface Treatment Agent]

In the production method of the present invention, a surface treatment agent is preferably added to the reaction system for suppressing aggregation of the silver powder deposited through reduction in the solution.

The addition method includes a method, in which a mixed solution obtained by adding the surface treatment agent to the reducing agent solution is added to the raw material solution, and a method, in which the surface treatment agent is added thereto after the addition of the reducing agent.

The surface treatment agent may be arbitrarily selected from the surface treatment agents that have been used for general silver powder, and for example, a fatty acid, such as stearic acid and oleic acid, a salt or an emulsion thereof, and an azole compound, such as benzotriazole, are preferably used.

The amount of the surface treatment agent added is preferably from 0.050% by mass to 0.500% by mass with respect to silver.

[Solid-Liquid Separation]

In the production method of the present invention, a dispersion liquid containing the flaky silver powder and the filamentous silver powder, which are solid metal particles, is obtained, and therefore the dispersion liquid is subjected to solid-liquid separation, and the resulting silver powder mixture is washed with water and dried.

The method of the solid-liquid separation may be any of the method having been industrially used, such as filtration and centrifugal separation.

[Conductive Paste]

The conductive paste of the present invention may contain at least the silver powder mixture, an organic resin as a binder, and a solvent, and may further contain other components, such as a glass frit, a surfactant, a dispersant, and a viscosity modifier, depending on purposes. The content of the silver powder mixture is not particularly limited, and may be appropriately selected depending on purposes.

The resin contained in the conductive paste of the present invention is not particularly limited in kind thereof, and may be appropriately selected depending on purposes. Specific examples thereof include such organic resins as an acrylic resin, a silicone resin, a urethane resin, fluorine rubber, nitrile rubber, ethyl cellulose, hydroxyethyl cellulose, and nitrocellulose. The organic resin may be used solely or as a combination of two or more kinds thereof.

The solvent used in the conductive paste of the present invention is not particularly limited in kind thereof, and may be appropriately selected depending on purposes. Specific examples thereof include such solvents as toluene, methyl ethyl ketone, methyl isobutyl ketone, tetradecane, tetralin, propyl alcohol, isopropyl alcohol, terpineol, ethyl carbitol, butyl carbitol, ethyl carbitol acetate, diethylene glycol monobutyl ether acetate, and 2,2,4-trimethyl-1,3-pentanediol monoisobutyrate. The solvent may be used solely or as a combination of two or more kinds thereof.

The glass frit that may be contained in the conductive paste of the present invention is not particularly limited in kind thereof, and may be appropriately selected depending on purposes. Specific examples thereof include such glass frits as a bismuth borosilicate based, an alkali metal borosilicate based, an alkaline earth metal borosilicate based, a zinc borosilicate based, a lead borosilicate based, a lead borate based, and a lead silicate based. The glass frit may be used solely or as a combination of two or more kinds thereof. The glass frit preferably contains no lead in view of the impact on the environment.

The surfactant that may be contained in the conductive paste of the present invention is not particularly limited in kind thereof, and may be appropriately selected depending on purposes. Specific examples thereof include an anionic surfactant, such as an alkylbenzene sulfonate salt and a polyoxyethylene alkyl ether phosphate salt, a cationic surfactant, such as an aliphatic quaternary ammonium salt, an amphoteric surfactant, such as imidazolium betaine, and a nonionic surfactant, such as a polyoxyethylene alkyl ether and a polyoxyethylene fatty acid ester. The surfactant may be used solely or as a combination of two or more kinds thereof.

The production method of the conductive paste of the present invention is not particularly limited, and may be appropriately selected depending on purposes. For example, the conductive paste can be produced by mixing the silver powder mixture, the organic resin, the solvent, and depending on necessity the glass frit, the surfactant, and other components, for example, with an ultrasonic disperser, a disper mixer, a three-roll mill, a ball mill, a bead mill, a twin screw kneader, and an a planetary mixer.

EXAMPLES

[Measurement Method for Shape of Silver Powder]

The silver powder mixture was observed with a scanning electron microscope (SEM), Model JSM-6100, produced by JEOL, Ltd., at a magnification of 2,000 to provide a secondary electron image (SEM image). For the flaky silver powder, 25 pieces each of the flaky silver powder in a direction capable of being measured for the thickness and the flaky silver powder in a direction capable of being measured for the particle diameter were selected in a view field in the SEM image, and measured for the thickness and the particle diameter, and the average value of the aspect ratio was calculated from these values. For the filamentous silver powder, arbitrary 50 pieces of the filamentous silver powder in the same view field were manually measured for the circle equivalent diameter of the spherical part and the long axis length and the short axis length of the filamentous part, and the average value of the circle equivalent diameter of the spherical part and the average value of the long axis length and the short axis length of the filamentous part were calculated from these values.

[Calculation Method of Projected Area Ratios of Various Silver Powder Constituting Silver Powder Mixture]

The silver powder mixture was observed with a scanning electron microscope (SEM), Model JSM-6100, produced by JEOL, Ltd., at a magnification of 2,000 to provide a secondary electron image, and the projected areas of the flaky silver powder, the filamentous silver powder, and the granular silver powder in a view field in the SEM image (SEM image) were measured with an image analysis software, "Region Adviser", produced by System In Frontier, Inc.

In the case where the independent granular silver powder having no connection to the filamentous shape was observed, the granular silver powder was selected, circular markers were manually disposed, and the total value of the projected areas of the markers was designated as the "granular area".

In the image analysis software, after removing noise by the "smoothing" process, the region with no silver powder present having darkness with a brightness less than the threshold value was identified to calculate the "total area of the silver powder". Thereafter, the contrast and the luminance were intensified, and the threshold value capable of distinguishing between the flaky silver powder and the granular silver powder having lower contrast and the filamentous silver powder having a high contrast was determined by controlling under visual inspection. The total of the projected areas having a brightness of the threshold value or more was designated as the "filamentous area". The flaky silver powder was calculated by (total area of silver powder)−(filamentous area)−(granular area)=(flaky area). In Comparative Examples 1 and 2 described later, no filamentous silver powder having a filamentous part extending from a spherical part was observed, and therefore after calculating the "granular area", the area of the filamentous silver powder having only a filamentous part was designated as the "filamentous area", with which the "flaky area" was calculated.

In the aforementioned calculation, SEM images of three or more view fields were taken, the projected areas of the granular silver powder, the filamentous silver powder, and the flaky silver powder were calculated for each of the images, and then the average values of the projected area ratios of these kinds of silver powder with respect to the total silver powder mixture were calculated from these values.

[Measurement Method of Average Particle Diameter]

0.1 g of the silver powder was added to 40 mL of isopropyl alcohol and dispersed therein for 2 minutes with an ultrasonic homogenizer having a chip diameter of 20 mm to prepare a specimen, which was measured the average particle diameter with a laser diffraction scattering particle size distribution measurement device, Microtrac MT3300 EXIT, produced by Microtrac BEL Corporation in the total reflection mode. The cumulative 10% particle diameter (D10), the cumulative 50% particle diameter (D50), the cumulative 90% particle diameter (D90) were calculated from the cumulative distribution by volume obtained by the measurement.

[Evaluation Method of Stretching Resistance of Conductive Film Containing Silver Powder Mixture]

75 parts by mass of the silver powder mixture and 8 parts by mass of an organic solvent soluble amorphous polyester resin, Vylon, produced by Toyobo Co., Ltd., as a binder were dissolved in 18.67 parts by mass of diethylene glycol monobutyl ether acetate (BCA) as a solvent, to which 0.1 part by mass of oleic acid (first class grade reagent), produced by Wako Pure Chemical Industries, Ltd., was added to prepare a conductive paste.

A pattern having a length of 38 mm was drawn with the conductive paste on a natural rubber substrate (Natural Rubber Sheet (black), produced by SK Co., Ltd., 500×500 mm, thickness: 0.5 mm) with a screen printer, MT-320TV, produced by Micro-tec Co., Ltd., and then dried in a hot air drier at 150° C. for 30 minutes to provide a specimen. The resistance between the both ends of the 38 mm pattern was measured with Digital Multimeter R6551, produced by Advantest Corporation, and then after applying an elongation of 35% (load: 250 g) to the specimen for 1 second five times, the resistance between the ends was again measured, from which the resistance increasing rate ((resistance after applying elongation)/(initial resistance)) was obtained. The aforementioned procedure was performed for three specimens, and the average value of the resistance increasing rates of the three specimens was calculated.

In the present invention, the case where the average value of the resistance increasing rate obtained by the aforementioned evaluation method was 2.5 or less was judged as good.

[Evaluation Method of Flexure Resistance of Conductive Film containing Silver Powder Mixture]

Conductive films containing a silver powder mixture were formed with the following four kinds of conductive pastes, and the conductive films were evaluated for the flexure resistance and the stretching resistance by the two evaluation methods described later. The compositions of the conductive paste used are as follows.

<Paste Composition 1, Polyester>

75 parts by mass of the silver powder mixture and 8 parts by mass of an organic solvent soluble amorphous polyester resin, Vylon, produced by Toyobo Co., Ltd., as a binder were dissolved in 18.67 parts by mass of diethylene glycol monobutyl ether acetate (BCA) as a solvent, to which 0.1 part by mass of oleic acid (first class grade reagent), produced by Wako Pure Chemical Industries, Ltd., was added to prepare a conductive paste.

<Paste Composition 2, Polyurethane>

92 parts by mass of the silver powder mixture, 8 parts by mass of a polyurethane resin, Urearno 8001, produced by Arakawa Chemical Industries, Ltd., as a binder, 0.16 part by mass of 2-ethyl-4-methylimidazole, produced by Wako Pure Chemical Industries, Ltd., and 0.1 part by mass of oleic acid, produced by Wako Pure Chemical Industries, Ltd., were added to prepare a conductive paste.

<Paste Composition 3, Fluorine Rubber>

68 parts by mass of the silver powder mixture and 9.5 parts by mass of fluorine rubber, G-801, produced by Daikin Industries, Ltd., as a binder were dissolved in 22.2 parts by mass of isophorone as a solvent, to which 0.9 part by mass of a fluorine surfactant, Surflon S-611, produced by AGC Seimi Chemical Co., Ltd., was added to prepare a conductive paste.

<Paste Composition 4, Silicone Resin>

85 parts by mass of the silver powder mixture, 15 parts by mass of a silicone resin, KE-106, produced by Shin-Etsu Chemical Co., Ltd., as a binder, 3 parts by mass of a silicone curing accelerator, CAT-RG, produced by Shin-Etsu Chemical Co., Ltd., and 0.1 part by mass of oleic acid, produced by Wako Pure Chemical Industries, Ltd., were added to prepare a conductive paste.

<Evaluation Method 1 for Flexure Resistance>

A pattern having a length of 38 mm was drawn with each of the conductive pastes having the compositions 1 to 4 on a polyethylene terephthalate (PET) substrate (Lumirror S-75, produced by Toray Industries, Inc., thickness: 75 μm) with a screen printer, MT-320TV, produced by Micro-tec Co., Ltd., and then dried in a hot air drier at 150° C. for 30 minutes to provide a specimen. The resistance between the both ends of the 38 mm pattern was measured with Digital Multimeter 86551, produced by Advantest Corporation, and then the thickness of the conductive film was measured with a laser microscope, VK-9700K/9710K, produced by Keyence Corporation, from which the specific resistance of the conductive film was calculated.

The square specimen having the conductive film of the 38 mm pattern formed thereon was held by the hand at both ends thereof, the center portion of the substrate was brought into contact with a bar portion of a spatula having a diameter of 0.3 mm, and the substrate was flexed with the bar portion as a pivot point until the both ends of the substrate reached the same position. In this case, the flexed substrate viewed from the axial direction of the bar was in the form of 180° turn at the bar portion of the spatula. Thereafter, the specimen was turned back, the surface thereof having no conductive film formed was brought into contact with the bar portion of the spatula, and the same operation was repeated. The aforementioned flexure of the substrate was repeated 10 times for each of the front and back surfaces, and then the resistance and the thickness of the conductive film were again measured, from which the resistance increasing rate by the evaluation test for the flexure resistance was calculated. The resistance increasing rate is expressed by (specific resistance after applying elongation)/(initial specific resistance). The measurement of the resistance increasing rate was performed three times for each condition, and the average value was used.

<Evaluation Method 2 for Stretching Resistance>

A specimen was produced in the same manner as in the evaluation method 1 for the flexure resistance except that a natural rubber substrate (Natural Rubber Sheet (black), produced by SK Co., Ltd., 500×500 mm, thickness: 0.5 mm) was used, and the specific resistance of the conductive film was calculated.

An elongation of 50% (elongation at a speed of 0.40 mm/s for 25 seconds) was applied 5 times to the square specimen having the conductive film of the 38 mm pattern formed thereon with a tensile and compression tester, SV51-0-50M, produced by Imada Seisakusho Co., Ltd., and then the resistance and the thickness of the conductive film were again measured, from which the resistance increasing rate by the evaluation test for the stretching resistance was calculated. The resistance increasing rate is expressed by (specific resistance after applying elongation)/(initial specific resistance). The measurement of the resistance increasing rate was performed three times for each condition, and the average value was used.

In the case where the natural rubber substrate was used as the substrate for the paste composition 4 (silicone resin), the paste suffered curing inhibition from natural rubber to cause exfoliation of the conductive film after applying elongation, and thus it was impossible to measure the flexure resistance and the stretching resistance.

Example 1

A silver nitrate aqueous solution containing 22.22 g of silver and 0.24 g of copper nitrate trihydrate (produced by Wako Pure Chemical Industries, Ltd., molar ratio with respect to silver: 0.0048) were added to 420.0 mL of pure water, and heated to 40° C. 0.30 g of tetrasodium ethylenediaminetetraacetate, produced by Chelest Corporation, (molar ratio with respect to silver: 0.0016) diluted with 20.0 mL of pure water was added to the resulting solution under stirring, so as to provide a silver complex solution. The silver complex solution had a silver concentration of 0.489 mol/L and a copper concentration of 0.00234 mol/L. After the elapse of 115 seconds as a retention time from the addition of the tetrasodium ethylenediaminetetraacetate solution, a mixed liquid obtained by adding 0.36 g of a stearic acid emulsion, Selosol 920, produced by Chukyo Yushi Co., Ltd., (stearic acid with respect to silver: 0.246% by mass) as a surface treatment agent to a reducing agent solution having a concentration of 0.526 mol/L retained at 25° C. (pure water: 211.2 mL, L-ascorbic acid, produced by Wako Pure Chemical Industries, Ltd.: 18.60 g (molar ratio with respect to silver: 0.51)) was added to the silver complex solution over 65 seconds. L-ascorbic acid as a divalent reducing agent reduced the total amount of silver and copper by an addition amount of 0.51 in terms of molar ratio with respect to silver. The concentration of silver with respect to the total amount of the liquid, i.e., 0.69 L, was 0.299 mol/L after the addition of the reducing agent solution.

Figure 1:
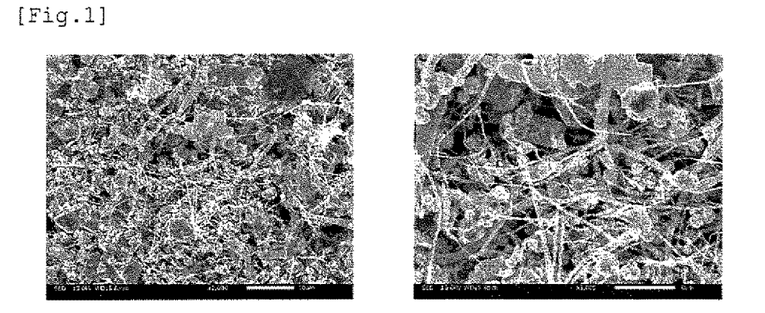
FIG. 1 is an SEM image of the silver powder mixture obtained in Example 1.

After the addition of the reducing agent solution, the solution was continuously stirred for 3 minutes, then filtered with a Buchner funnel, and washed with water. The resulting wet cake was dried in a vacuum drier set at 73° C. The dried cake was pulverized with a coffee mill to provide a silver powder mixture. FIG. 1 shows the SEM image of the silver powder mixture obtained in this example. In FIG. 1, the length of the white line shown in the bottom part of the SEM image on the left side shows 10 μm, and the white line in the SEM image on the right side shows 5 μm (which are the same hereinafter).

The projected area ratios of the filamentous shape (including the spherical part and the filamentous part) and the flaky shape calculated from the SEM image of the resulting silver powder mixture were 32.3% and 54.8% respectively, and the balance (12.9%) was coarse particles having a particle diameter exceeding 2 μm. No independent granular silver powder was observed except for the coarse particles.

The circle equivalent diameter of the spherical part of the filamentous shape (including the spherical part and the filamentous part) was 1.0 μm in average, and the average long axis length and the average short axis length of the filamentous part were 5 μm and 140 nm respectively.

By using the resulting silver powder mixture, the conductive film containing the silver powder mixture was evaluated for the stretching resistance by the evaluation method described above. The resistance increasing rate after applying an elongation of 35% for 1 second five times was 1.3, which was an excellent value as compared to Comparative Examples described later.

Table 1 shows the production condition, the area ratios of the various kinds of silver powder in the resulting silver powder mixture, and the evaluation result of the stretching resistance of the conductive film of this example, the other Examples, and Comparative Examples.

Example 2

A silver nitrate aqueous solution containing 55.55 g of silver (produced by Dowa Hightech Co., Ltd.) and 0.30 g of copper nitrate trihydrate (produced by Wako Pure Chemical Industries, Ltd., molar ratio with respect to silver: 0.0024) were added to 3,861.0 mL of pure water, and heated to 40° C. 2.56 g of nitric acid diluted with 10.0 mL of pure water (produced by Dowa Hightech Co., Ltd., molar ratio with respect to silver: 0.055) and 0.36 g of tetrasodium ethylenediaminetetraacetate, produced by Chelest Corporation, (molar ratio with respect to silver: 0.0008) diluted with 10.0 mL of pure water were added to the resulting solution under stirring, so as to provide a silver complex solution. The silver complex solution had a silver concentration of 0.133 mol/L and a copper concentration of 0.00032 mol/L. After the elapse of 115 seconds as a retention time from the addition of the tetrasodium ethylenediaminetetraacetate solution, a mixed liquid obtained by adding 1.82 g of a stearic acid emulsion, Selosol 920, produced by Chukyo Yushi Co., Ltd., (stearic acid with respect to silver: 0.491% by mass) as a surface treatment agent to a reducing agent solution having a concentration of 0.526 mol/L retained at 25° C. (pure water: 528.0 mL, L-ascorbic acid, produced by Wako Pure Chemical Industries, Ltd.: 46.49 g (molar ratio with respect to silver: 0.51)) was added to the silver complex solution over 4 seconds. L-ascorbic acid as a divalent reducing agent reduced the total amount of silver (and copper) by an addition amount of 0.51 in terms of molar ratio with respect to silver. The concentration of silver with respect to the total amount of the liquid, i.e., 4.50 L, was 0.114 mol/L after the addition of the reducing agent solution.

Figure 2:
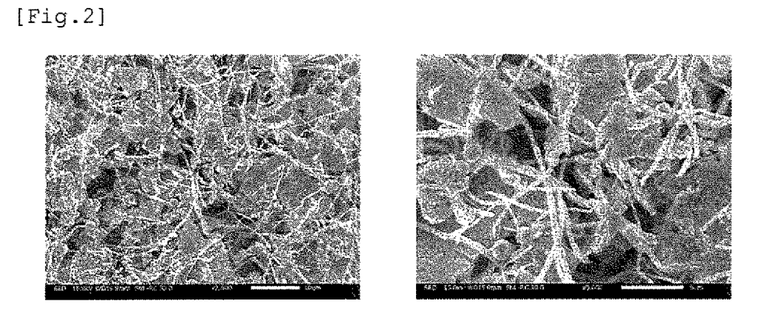
FIG. 2 is an SEM image of the silver powder mixture obtained in Example 2.

After the addition of the reducing agent solution, the solution was continuously stirred for 3 minutes, then filtered with a Buchner funnel, and washed with water. The resulting wet cake was dried in a vacuum drier set at 73° C. The dried cake was pulverized with a coffee mill to provide a silver powder mixture. FIG. 2 shows the SEM image of the silver powder mixture obtained in this example.

The projected area ratios of the filamentous shape (including the spherical part and the filamentous part) and the flaky shape calculated from the SEM image of the resulting silver powder mixture were 48.9% and 51.1% respectively, and no independent granular silver powder was observed.

The circle equivalent diameter of the spherical part of the filamentous shape (including the spherical part and the filamentous part) was 1.4 μm in average, and the average long axis length and the average short axis length of the filamentous part were 12 μm and 460 nm respectively.

By using the resulting silver powder mixture, the conductive film containing the silver powder mixture was evaluated for the stretching resistance by the evaluation method described above. The resistance increasing rate after applying an elongation of 35% for 1 second five times was 1.6, which was an excellent value as compared to the comparative examples described later.

Example 3

A silver nitrate aqueous solution containing 55.55 g of silver (produced by Dowa Hightech Co., Ltd.) and 0.30 g of copper nitrate trihydrate (produced by Wako Pure Chemical Industries, Ltd., molar ratio with respect to silver: 0.0024) were added to 3,346.0 mL of pure water, and heated to 40° C. 0.73 g of tetrasodium ethylenediaminetetraacetate, produced by Chelest Corporation, (molar ratio with respect to silver: 0.0016) diluted with 10.0 mL of pure water was added to the resulting solution under stirring, so as to provide a silver complex solution. The silver complex solution had a silver concentration of 0.154 mol/L and a copper concentration of 0.00037 mol/L. After the elapse of 115 seconds as a retention time from the addition of the tetrasodium ethylenediaminetetraacetate solution, a mixed liquid obtained by adding 0.55 g of a stearic acid emulsion, Selosol 920, produced by Chukyo Yushi Co., Ltd., (stearic acid with respect to silver: 0.153% by mass) as a surface treatment agent to a reducing agent solution having a concentration of 0.263 mol/L retained at 25° C. (pure water: 1,056.0 mL, L-ascorbic acid, produced by Wako Pure Chemical Industries, Ltd.: 46.49 g (molar ratio with respect to silver: 0.51)) was added to the silver complex solution over 4 seconds. L-ascorbic acid as a divalent reducing agent reduced the total amount of silver (and copper) by an addition amount of 0.51 in terms of molar ratio with respect to silver. The concentration of silver with respect to the total amount of the liquid, i.e., 4.50 L, was 0.114 mol/L after the addition of the reducing agent solution.

Figure 3:
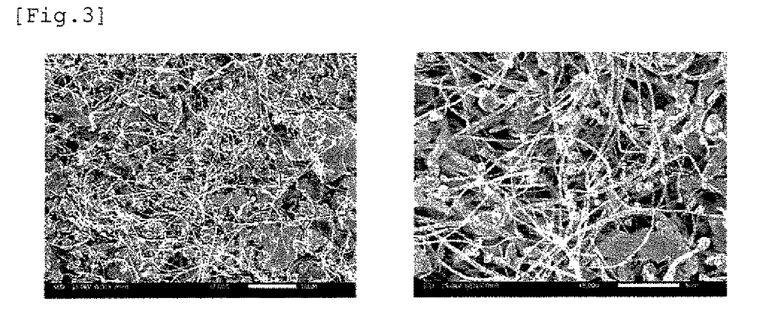
FIG. 3 is an SEM image of the silver powder mixture obtained in Example 3.

After the addition of the reducing agent solution, the solution was continuously stirred for 3 minutes, then filtered with a Buchner funnel, and washed with water. The resulting wet cake was dried in a vacuum drier set at 73° C. The dried cake was pulverized with a coffee mill to provide a silver powder mixture. FIG. 3 shows the SEM image of the silver powder mixture obtained in this example.

The projected area ratios of the filamentous shape (including the spherical part and the filamentous part) and the flaky shape calculated from the SEM image of the resulting silver powder mixture were 61.7% and 38.3% respectively, and no independent granular silver powder was observed.

The circle equivalent diameter of the spherical part of the filamentous shape (including the spherical part and the filamentous part) was 1.1 μm in average, and the average long axis length and the average short axis length of the filamentous part were 18 μm and 180 nm respectively.

By using the resulting silver powder mixture, the conductive film containing the silver powder mixture was evaluated for the stretching resistance by the evaluation method described above. The resistance increasing rate after applying an elongation of 35% for 1 second five times was 2.3.

Example 4

A silver nitrate aqueous solution containing 636.33 g of silver and 3.43 g of copper nitrate trihydrate (produced by Wako Pure Chemical Industries, Ltd., molar ratio with respect to silver: 0.0024) were added to 63.8 L of pure water, and heated to 40° C. 8.34 g of tetrasodium ethylenediaminetetraacetate, produced by Chelest Corporation, (molar ratio with respect to silver: 0.0016) diluted with 83.4 mL of pure water was added to the resulting solution under stirring, so as to provide a silver complex solution. The silver complex solution had a silver concentration of 0.092 mol/L and a copper concentration of 0.00022 mol/L. After the elapse of 210 seconds as a retention time from the addition of the tetrasodium ethylenediaminetetraacetate solution, a reducing agent solution having a concentration of 0.172 mol/L retained at 25° C. (pure water: 17.5 L, L-ascorbic acid, produced by Fuso Chemical Co., Ltd.: 532.5 g (molar ratio with respect to silver: 0.51)) was added to the silver complex solution over 4 seconds. L-ascorbic acid as a divalent reducing agent reduced the total amount of silver and copper by an addition amount of 0.51 in teams of molar ratio with respect to silver. After the addition of the reducing agent solution, the solution was continuously stirred for 30 seconds, and then 6.30 g of a stearic acid emulsion, Selosol 920, produced by Chukyo Yushi Co., Ltd., (stearic acid with respect to silver: 0.153% by mass) as a surface treatment agent diluted with 62.6 mL of pure water was added. The concentration of silver with respect to the total amount of the liquid, i.e., 82.5 L, was 0.072 mol/L after the addition of the reducing agent solution.

Figure 4:
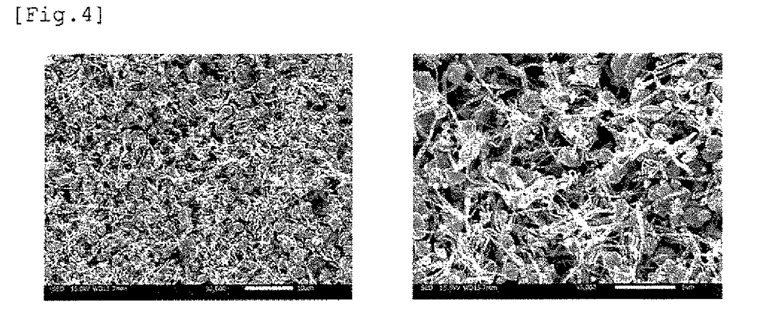
FIG. 4 is an SEM image of the silver powder mixture obtained in Example 4.

After the addition of the reducing agent solution, the solution was continuously stirred for 4 minutes and 30 seconds, then filtered with a press filter, and washed with water. The resulting wet cake was dried in a vacuum drier set at 73° C. The dried cake was pulverized with a blender, and sieved through a mesh having an aperture of 75 um to provide a silver powder mixture of Example 4. FIG. 4 shows the SEM image of the silver powder mixture obtained in this example.

The projected area ratios of the filamentous shape (including the spherical part and the filamentous part), the flaky shape, and the granular shape calculated from the SEM image of the resulting silver powder mixture were 56.2%, 42.4%, and 1.4% respectively.

The circle equivalent diameter of the spherical part of the filamentous shape (including the spherical part and the filamentous part) was 0.8 μm in average, and the average long axis length and the average short axis length of the filamentous part were 8 μm and 250 nm respectively.

By using the resulting silver powder mixture, the conductive film containing the silver powder mixture was evaluated for the stretching resistance by the evaluation method described above. The resistance increasing rate after applying an elongation of 35% (load: 250 g) for 1 second five times was 2.3.

By using the resulting silver powder mixture, in the case where the binder was the polyester in the evaluation method 1 for flexure resistance, the resistance increasing rate was 2.7. In the case where the binder was the polyurethane, the fluorine rubber, and the silicone resin, the resistance increasing rate was 3.2, 2.8, and 2.3 respectively. In the evaluation method 2 for stretching resistance, the resistance increasing rate was 2.6 with the polyurethane used as the binder, and 3.8 with the fluorine rubber as the binder. These values were all excellent as compared to Comparative Examples.

The evaluation results of this example and Comparative Examples are shown in Table 2.

Comparative Example 1

Figure 5:
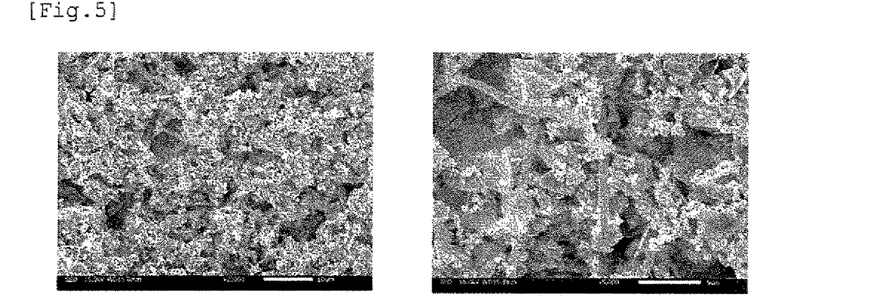
FIG. 5 is an SEM image of the silver powder mixture obtained in Comparative Example 1.

A silver powder mixture was obtained in the same manner as in Example 1 except that the retention time of the silver complex solution from the addition of the tetrasodium ethylenediaminetetraacetate solution was changed from 115 seconds to 10 seconds. FIG. 5 shows the SEM image of the silver powder mixture obtained in this comparative example.

In the SEM image of the resulting silver powder mixture, the area ratio of independent granular silver powder having no connection to the silver powder of the other shapes was 60%, filamentous silver powder including the spherical part and the filamentous part defined in the present invention was not observed, filamentous silver powder having only a filamentous part having a shape formed by extending a part of a flake was observed in 6.8%, and flaky silver powder was observed in 33.2%.

By using the resulting silver powder mixture, the stretching resistance of the conductive film containing the silver powder mixture was tried to evaluate by the aforementioned evaluation method, but was failed to evaluate due to disconnection.

By using the resulting silver powder mixture, in the case where the binder was the polyester in the evaluation method 1 for flexure resistance, the resistance increasing rate was 5.5, which was inferior to Example 4.

Comparative Example 2

Figure 6:
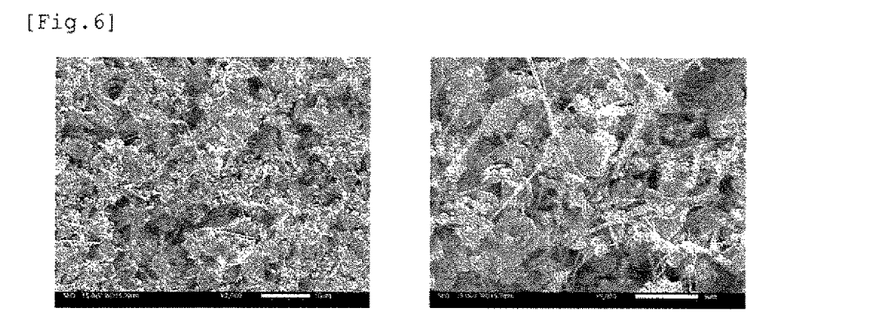
FIG. 6 is an SEM image of the silver powder mixture obtained in Comparative Example 2.

A silver powder mixture was obtained in the same manner as in Example 1 except that the retention time of the silver complex solution from the addition of the tetrasodium ethylenediaminetetraacetate solution was changed from 115 seconds to 60 seconds. FIG. 6 shows the SEM image of the silver powder mixture obtained in this comparative example.

In the SEM image of the resulting silver powder mixture, the area ratio of independent granular silver powder having no connection to the silver powder of the other shapes was 20%, filamentous silver powder including the spherical part and the filamentous part defined in the present invention was not observed, filamentous silver powder having only a filamentous part having a shape formed by extending a part of a flake was observed in 20%, and flaky silver powder was observed in 60%.

By using the resulting silver powder mixture, the stretching resistance of the conductive film containing the silver powder mixture was tried to evaluate by the aforementioned evaluation method, but was failed to evaluate due to disconnection.

The SEM image of the silver powder mixture obtained in this comparative example was analogous to the silver powder mixture described in PTL 5, and the projected area ratio of the filamentous silver powder satisfied 20%, the preferred range in the present invention, but it was considered that the stretching resistance was deteriorated since the filamentous silver powder was constituted only by the filamentous part.

By using the resulting silver powder mixture, in the case where the binder was the polyester in the evaluation method 1 for flexure resistance, the resistance increasing rate was 5.5, which was inferior to Example 4.

Comparative Examples 3 and 4

Figure 7:
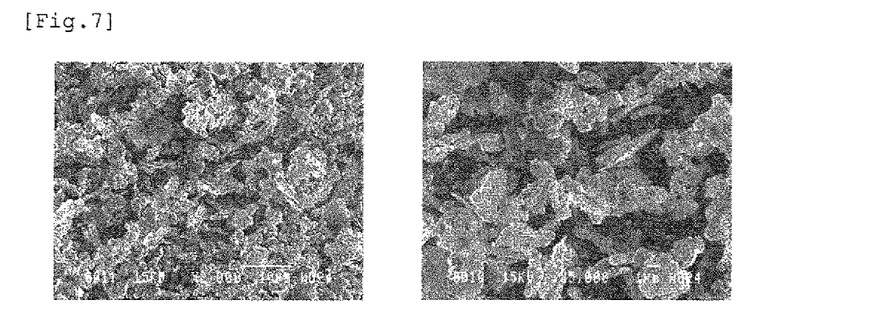
FIG. 7 is an SEM image of the granular silver powder used in Comparative Example 3.
Figure 8:
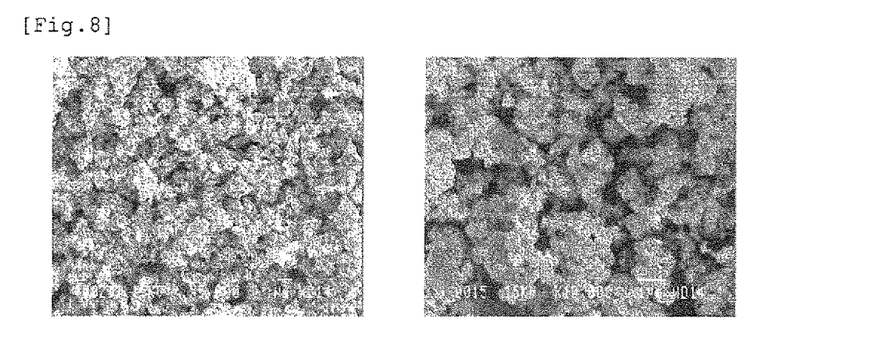
FIG. 8 is an SEM image of the aggregated silver powder used in Comparative Example 4.

As Comparative Example 3 and 4, by using the commercially available flaky silver powder, FA-D-2, and the commercially available aggregated silver powder, G-35, produced by Dowa Hightech Co., Ltd., the stretching resistance of the conductive film containing the silver powder mixture was evaluated by the evaluation method described above. The evaluation results shown in Table 1 were values inferior to the values obtained in Examples shown above. The SEM images used for the evaluation are shown in FIGS. 7 and 8.

In the case where the binder was the polyester in the evaluation method 1 for flexure resistance, the resistance increasing rate was 5.1 in Comparative Example 3 and 4.1 in Comparative Example 4, and thus the resistance increasing rates in both cases were inferior to Example 4. In the case where the binder was the polyurethane, the resistance increasing rate was 4.3 in Comparative Example 3, and was unmeasurable due to disconnection in Comparative Example 4 (which is shown by OL in Table 2). In the case where the binder was the fluorine rubber, the specific resistance after the evaluation test exceeded 1 mΩ·cm in Comparative Example 3 (which is shown by NG in Table 2), and was unmeasurable due to disconnection in Comparative Example 4 (which is shown by OL in Table 2). In the case where the binder was the silicone resin, the specific resistance after the evaluation test exceeded 1 mΩ·cm in Comparative Example 3.

In the case where the binder was the polyester in the evaluation method 2 for stretching resistance, the specific resistance after the evaluation test exceeded 1 mΩ·cm, and the resistance increasing rate was 6.2 in Comparative Example 4. In the case where the binder was the silicone resin, the specific resistance after the evaluation test exceeded 1 mΩ·cm in Comparative Example 3, and the resistance increasing rate was 4.7 in Comparative Example 4.

It is understood from the results shown above that the mixed silver powder obtained by the present invention contributes to the enhancement of the stretching resistance and the flexure resistance of the conductive film formed therewith.

TABLE 1

| | Ag concentration in reaction liquid (mol/L) | Amount of Cu added molar ratio (Cu/Ag) | Retention time (s) | Amount of EDTA added molar ratio (EDTA/Ag) | Projected area ratio of silver powder | | | | Resistance increasing rate |
|---|---|---|---|---|---|---|---|---|---|
| | | | | | Filamentous (sphere + filament) | Filamentous (filament only) | Flaky | Granular | |
| Example 1 | 0.299 | 0.0048 | 115 | 0.0016 | 32.3 | 0 | 54.8 | 12.9* | 1.3 |
| Example 2 | 0.114 | 0.0024 | 115 | 0.0008 | 48.9 | 0 | 51.1 | 0 | 1.6 |
| Example 3 | 0.114 | 0.0024 | 115 | 0.0016 | 61.7 | 0 | 38.3 | 0 | 2.3 |
| Example 4 | 0.092 | 0.0024 | 210 | 0.0016 | 56.2 | 0 | 42.4 | 1.4 | 2.3 |
| Comparative Example 1 | 0.299 | 0.0048 | 10 | 0.0016 | 0 | 6.8 | 33.2 | 60.0 | — |
| Comparative Example 2 | 0.299 | 0.0048 | 60 | 0.0016 | 0 | 20.0 | 60.0 | 20.0 | — |
| Comparative Example 3 | — | — | — | — | — | — | 100 | — | 2.8 |
| Comparative Example 4 | — | — | — | — | — | — | — | 100 | 3.2 |

*coarse particles

TABLE 2

| | Resistance increasing rate | | | | | |
|---|---|---|---|---|---|---|
| | PET substrate | | | | Natural rubber substrate | |
| | Polyester | Poly-urethane | Fluorine rubber | Silicone resin | Poly-urethane | Fluorine rubber |
| Example 4 | 2.7 | 3.2 | 2.8 | 2.3 | 2.6 | 3.8 |
| Comparative Example 1 | 5.5 | — | — | — | — | — |
| Comparative Example 2 | 5.5 | — | — | — | — | — |
| Comparative Example 3 | 5.1 | 4.3 | NG | NG | NG | NG |
| Comparative Example 4 | 4.1 | OL | OL | — | 6.2 | 4.7 |

OL: unmeasurable due to disconnection
NG: specific resistance after evaluation test exceeding 1 mΩ · cm

The invention claimed is:

1. A silver powder mixture comprising filamentous silver powder and flaky silver powder, wherein the filamentous silver powder includes a spherical part and a filamentous part, the filamentous part extends from the spherical part and having a short axis length that is smaller than a particle diameter of the spherical part and has an average short axis length of 50 nm or more and 900 nm or less, and the spherical part has an average of a particle diameter as a circle-equivalent diameter measured with SEM of from 0.15 to 2 μm, and wherein the silver powder mixture has a projected area ratio of the filamentous silver powder of 20% or more in the mixed silver powder.

2. The silver powder mixture according to claim 1, wherein
the filamentous part of the filamentous silver powder has an average long axis length of 2 μm or more and 20 μm or less, and
the flaky silver powder has an average particle diameter of 1 μm or more and 50 μm or less and an aspect ratio, which is defined by a ratio of an average long diameter and an average thickness, of 1.5 or more.

3. The silver powder mixture according to claim 1, wherein the silver powder mixture has a content of granular silver powder of less than 20%.

4. A conductive paste comprising the silver powder mixture according to claim 1.

5. A method for producing the silver powder mixture according to claim 1, comprising:
adding one kind of a salt of copper or aluminum and ethylenediaminetetraacetic acid to a silver nitrate aqueous solution to provide a silver complex solution;
after adding ethylenediaminetetraacetic acid, retaining the silver complex solution under stirring for 90 seconds or more; and
adding a reducing agent containing one kind or two or more kinds of L-ascorbic acid, erythorbic acid, and salts thereof to the silver complex solution retained for 90 seconds or more.

6. The method for producing a silver powder mixture according to claim 5, wherein the silver complex solution before adding the reducing agent has a silver concentration of from 0.05 mol/L to 1 mol/L, and an amount of the reducing agent added is from 0.05 mol/L to 1 mol/L based on the liquid amount of the silver complex solution before adding the reducing agent.

7. A method for producing a silver powder mixture containing the filamentous silver powder according to claim 5, an amount of the one kind of a salt of copper or aluminum added being from 0.001 to 0.02 in terms of molar ratio with respect to silver, and an amount of the ethylenediaminetetraacetic acid added being from 0.0005 to 0.015 in terms of molar ratio with respect to silver.

* * * * *